United States Patent
Dave et al.

(10) Patent No.: US 12,122,134 B2
(45) Date of Patent: Oct. 22, 2024

(54) GLASS ARTICLE HAVING FRAME CONFIGURED FOR MINIMAL SHAPE DEVIATION AND HAVING SMALL BEZEL WIDTH

(71) Applicant: CORNING INCORPORATED, Corning, NY (US)

(72) Inventors: Gaurav Dave, Painted Post, NY (US); Khaled Layouni, Fontainebleau (FR); Mincong Liu, Painted Post, NY (US); Elias Merhy, Saulx-les-Chartreux (FR); Quentin Jean André Pierron, Dammarie-lès-Lys (FR); Michael William Price, Corning, NY (US); Fraaz Tahir, Santa Clara, CA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/920,887

(22) PCT Filed: Apr. 13, 2021

(86) PCT No.: PCT/US2021/026996
§ 371 (c)(1),
(2) Date: Oct. 24, 2022

(87) PCT Pub. No.: WO2021/216317
PCT Pub. Date: Oct. 28, 2021

(65) Prior Publication Data
US 2023/0182459 A1   Jun. 15, 2023

Related U.S. Application Data

(60) Provisional application No. 63/014,401, filed on Apr. 23, 2020.

(51) Int. Cl.
   *B32B 17/06*   (2006.01)
   *B32B 7/12*    (2006.01)
   (Continued)

(52) U.S. Cl.
   CPC .............. *B32B 37/12* (2013.01); *B32B 7/12* (2013.01); *B32B 17/061* (2013.01); *B32B 17/10* (2013.01);
   (Continued)

(58) Field of Classification Search
   CPC .... G06F 1/1647; G06F 1/1641; G06F 1/1637; B60R 11/0229; B60R 11/0235; C03B 23/023; C03B 23/0305
   (Continued)

(56) References Cited

U.S. PATENT DOCUMENTS

2007/0026238 A1\* 2/2007 Chiappetta .......... C03B 23/0252
                                                   65/111
2010/0031590 A1\* 2/2010 Buchwald ................ E06B 3/66
                                                   52/173.3
(Continued)

FOREIGN PATENT DOCUMENTS

JP    2013-188993 A    9/2013
WO    2018/129065 A2   7/2018
(Continued)

OTHER PUBLICATIONS

International Search Report and Written Opinion of the International Searching Authority; PCT/US21/26996; dated Jun. 21, 2021; 11 pages; European Patent Office.

*Primary Examiner* — Alicia J Weydemeyer
(74) *Attorney, Agent, or Firm* — William M. Johnson; Payal A. Patel

(57) ABSTRACT

Emobidments of a curved glass article are disclosed herein. The curved glass article includes a glass sheet first and
(Continued)

second major surfaces. The glass sheet is bent to define a curved region disposed between flat sections. The curved glass article also includes a carrier adhered to the glass sheet. The carrier includes longitudinal strips and lateral strips. The longitudinal strips define the radius of curvature of the curved region. The lateral strips extend between the longitudinal strips. The glass sheet deviates 0.3 mm or less from planar in the flat sections. The longitudinal strips each have a width $W_{long}$ of 2 mm or less. The first lateral strips each have a width $W_{lat}$ of 20 mm or less. At least a portion of the width $W_{lat}$ of each lateral strip is located in the curved region and a flat section.

15 Claims, 9 Drawing Sheets

(51) Int. Cl.
    *B32B 17/10*     (2006.01)
    *B32B 37/12*     (2006.01)
    *B32B 38/00*     (2006.01)
    *C03B 23/023*     (2006.01)
    *C03C 27/04*     (2006.01)

(52) U.S. Cl.
    CPC .......... *B32B 38/0012* (2013.01); *C03C 27/04* (2013.01); *B32B 2307/732* (2013.01); *B32B 2457/20* (2013.01); *C03B 23/023* (2013.01)

(58) Field of Classification Search
    USPC .......................................... 65/102, 106, 107
    See application file for complete search history.

(56) References Cited

U.S. PATENT DOCUMENTS

| | | | |
|---|---|---|---|
| 2014/0170378 A1* | 6/2014 | Bellman | B32B 17/06 156/60 |
| 2015/0086048 A1* | 3/2015 | Brown | H04R 7/045 381/152 |
| 2018/0050948 A1 | 2/2018 | Faik et al. | |
| 2018/0188869 A1* | 7/2018 | Boggs | B60K 35/10 |
| 2019/0332217 A1 | 10/2019 | Boggs et al. | |
| 2020/0062632 A1 | 2/2020 | Brennan et al. | |

FOREIGN PATENT DOCUMENTS

| | | |
|---|---|---|
| WO | 2019/017915 A1 | 1/2019 |
| WO | 2019/075065 A1 | 4/2019 |

* cited by examiner

GLASS ARTICLE HAVING FRAME CONFIGURED FOR MINIMAL SHAPE DEVIATION AND HAVING SMALL BEZEL WIDTH

This application claims the benefit of priority under 35 U.S.C. § 371 of International Application No. PCT/US2021/026996, filed on Apr. 13, 2021, which claims the benefit of priority under 35 U.S.C. § 119 of U.S. Provisional Application Ser. No. 63/014,401 filed on Apr. 23, 2020, the content of which are relied upon and incorporated herein by reference in their entirety.

BACKGROUND

The disclosure relates to glass articles and methods for forming same, and more particularly to vehicle interior systems including a glass article with carrier providing low shape deviation and high mechanical reliability.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as thermal forming, have drawbacks including high cost, optical distortion, and surface marking. Accordingly, Applicant has identified a need for vehicle interior systems that can incorporate a curved glass substrate in a cost-effective manner and without problems typically associated with glass thermal forming processes.

SUMMARY

According to an aspect, embodiments of the disclosure relate to a curved glass article. The curved glass article includes a glass sheet having a first major surface and a second major surface opposite to the first major surface. The glass sheet is bent into a curved configuration defining a curved region disposed between a first flat section and a second flat section. The curved region has a radius of curvature of at least 250 mm. The curved glass article also includes a carrier adhered to the second major surface of the glass sheet and configured to maintain the glass sheet in the curved configuration. The carrier includes a first longitudinal strip, a second longitudinal strip, a first lateral strip, and a second lateral strip. The first longitudinal strip is spaced apart from the second longitudinal strip, and the first longitudinal strip and the second longitudinal strip define the radius of curvature of the curved region. The first lateral strip is spaced apart from the second lateral strip, and the first lateral strip and the second lateral strip extend between the first longitudinal strip to the second longitudinal strip. The glass sheet deviates 0.3 mm or less from planar in the first flat section and in the second flat section. The first longitudinal strip and the second longitudinal strip each have a width $W_{long}$ of 2 mm or less. Further, the first lateral strip and the second lateral strip each have a width $W_{lat}$ of 20 mm or less. At least a portion of the width $W_{lat}$ of the first lateral strip is located in the curved region and in first flat section, and at least a portion of the width $W_{lat}$ of the second lateral strip is located in the curved region and in the second flat section.

According to another aspect, embodiments of the disclosure relate to a curved glass article. The curved glass article includes a glass sheet having a first major surface and a second major surface opposite to the first major surface. The glass sheet is bent into a curved configuration defining a curved region disposed between a first flat section and a second flat section. The curved region has a radius of curvature of at least 250 mm. A carrier is adhered to the second major surface of the glass sheet and is configured to maintain the glass sheet in the curved configuration. The carrier includes a first longitudinal strip, a second longitudinal strip, a first lateral strip, a second lateral strip, a third lateral strip, and a fourth lateral strip. The first longitudinal strip is spaced apart from the second longitudinal strip, the first longitudinal strip and the second longitudinal strip define the radius of curvature of the curved region. The first lateral strip, the second lateral strip, the third lateral strip, and the fourth lateral strip extend between the first longitudinal strip to the second longitudinal strip. The glass sheet deviates 0.3 mm or less from planar in the first flat section and in the second flat section. Each of the longitudinal and lateral strips has a width of 2 mm or less. Further, the first lateral strip is disposed in the first flat section, the second lateral strip and the third lateral strip are disposed in the curved region, and the fourth lateral strip is disposed in the second flat section.

According to still another aspect, embodiments of the disclosure relate to a method of preparing a curved glass article in which a glass sheet is bent into conformity with a carrier having a curvature with a radius of curvature of at least 250 mm. The bending is performed at a temperature of 200° C. or less. The glass sheet has a first major surface and a second major surface. The second major surface is opposite to the first major surface. The carrier includes a first longitudinal strip, a second longitudinal, and at least two lateral strips. The at least two lateral strips extend between the first longitudinal strip and the second longitudinal strip. Upon bending the glass sheet has a curved region disposed between a first flat section and a section flat section. In the method, the glass sheet is adhered to the carrier so as to provide a curved glass article having a shape deviation of ±0.3 mm in the flat sections. The first longitudinal strip and the second longitudinal strip each have a width $W_{long}$ of 2 mm or less. Further, a first lateral strip of the at least two lateral strips is located at least partially in the first flat section, and a second lateral strip of the at least two lateral strips is located at least partially in the second flat section.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Reference will now be made in detail to various embodiments, examples of which are illustrated in the accompanying drawings. In general, the various embodiments pertain to vehicle interior systems having curved glass surfaces. In the embodiments discussed herein, the curved glass surfaces comprise a glass sheet bonded to a carrier that holds the glass in its curved shape. Further, the carrier is configured to be mounted to a frame of an automotive interior system. As will be described herein, the carrier provides a minimal non-display region (referred to herein as a "bezel") that can be as small as 1 mm on the top and bottom sides and as small as 8 mm on the lateral sides (for a glass article having a 0.7 mm thick glass sheet, rectangular carrier, and radius of curvature of 250 mm), leaving a large majority of the glass surface available for viewing a rear-mounted display. Additionally, the shape and width of the carrier are configured to provide mechanical reliability against cold-forming stresses and thermal stresses associated with typical operating environments. Various embodiments of the carrier and configurations for mounting the carrier to a vehicle frame are disclosed herein. These embodiments are provided by way of illustration and not by way of limitation.

In general, a vehicle interior system may include a variety of different curved surfaces that are designed to be transparent, such as curved display surfaces and curved non-display glass covers. Forming curved vehicle surfaces from a glass material provide a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials.

Figure 1:
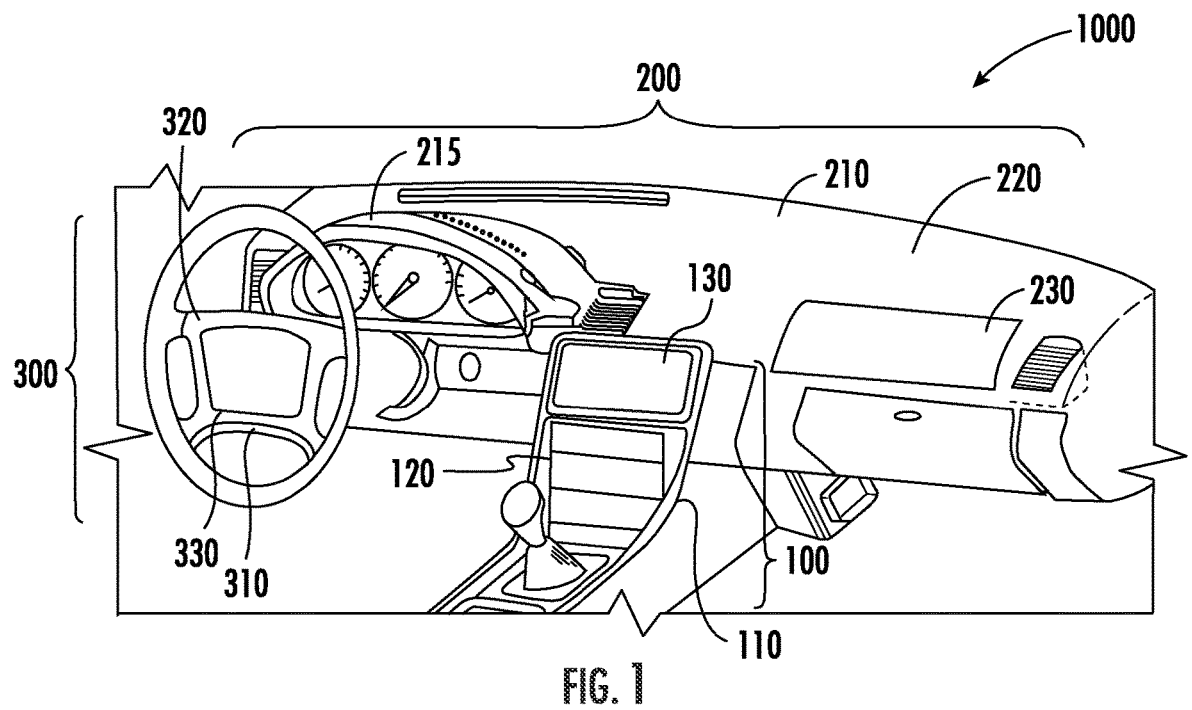
FIG. 1 is a perspective view of a vehicle interior with vehicle interior systems, according to exemplary embodiments.

FIG. 1 shows an exemplary vehicle interior 1000 that includes three different embodiments of a vehicle interior system 100, 200, 300. Vehicle interior system 100 includes a frame, shown as center console base 110, with a curved surface 120 including an optically bonded display 130. Vehicle interior system 200 includes a frame, shown as dashboard base 210, with a curved surface 220 including an optically bonded display 230. The dashboard base 210 typically includes an instrument panel 215 which may also include an optically bonded display. Vehicle interior system 300 includes a frame, shown as steering wheel base 310, with a curved surface 320 and an optically bonded display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle). In embodiments, the optically bonded display 130, 230, 330 is at least one of a light emitting diode (LED) display, an organic LED (OLED) display, a liquid crystal display (LCD), or plasma display.

The embodiments of the glass article described herein can be used in each of vehicle interior systems 100, 200 and 300. Further, the glass articles discussed herein may be used as curved cover glasses for any of the display embodiments discussed herein, including for use in vehicle interior systems 100, 200 and/or 300. Further, in various embodiments, various non-display components of vehicle interior systems 100, 200 and 300 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront or color matching functionality.

Figure 2A:
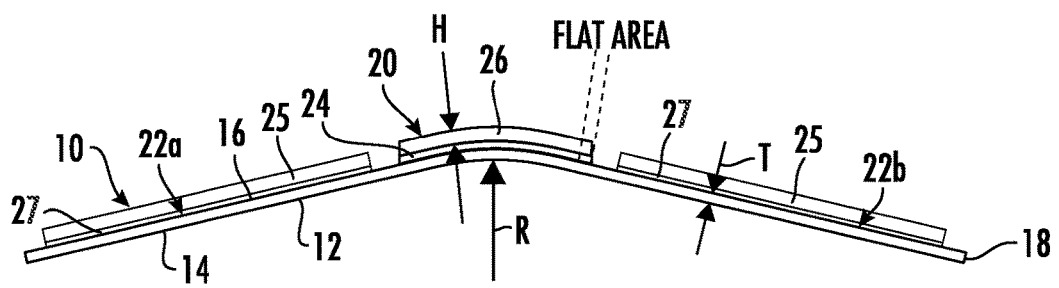
FIGS. 2A and 2B depict a side view and a rear view, respectively, of a V-shaped glass article, according to an exemplary embodiment.
Figure 2B:
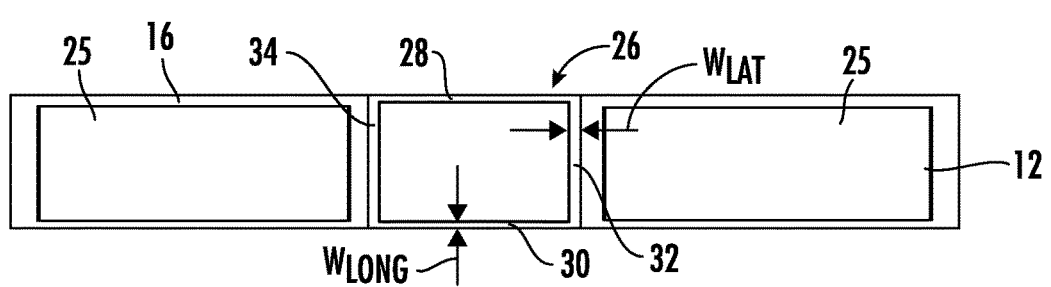
Figure 4A:
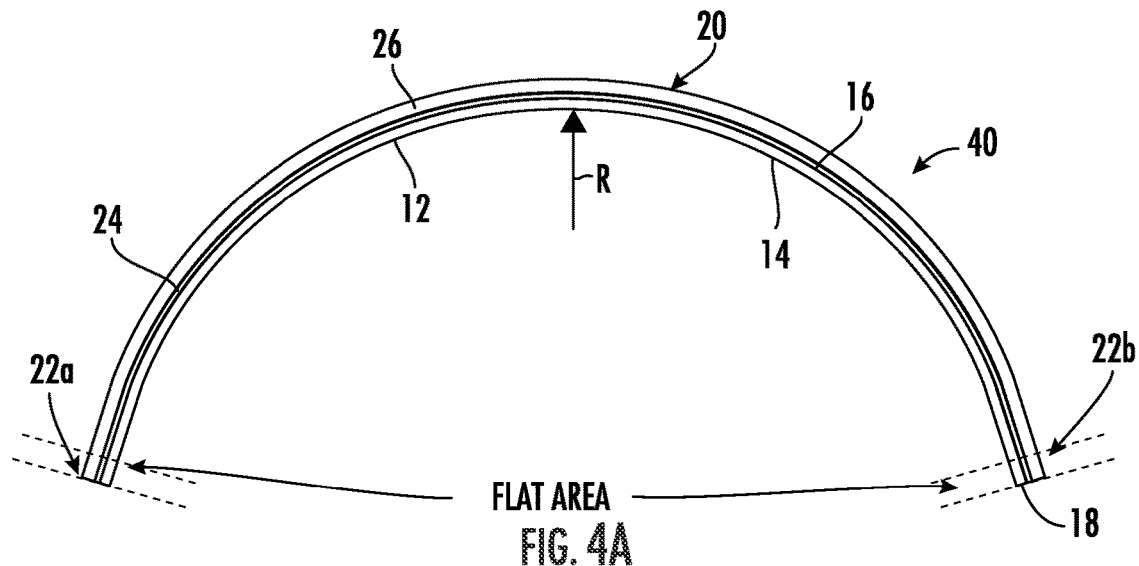
FIGS. 4A and 4B depict a side view and a rear view, respectively, of a C-shaped glass article, according to an exemplary embodiment.
Figure 4B:
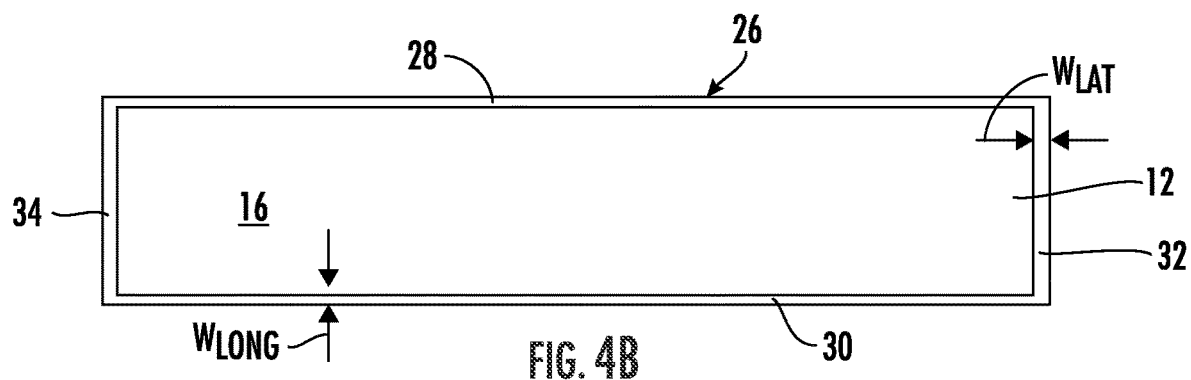

In embodiments, the curved surfaces 120, 220, 320 are generally either V-shaped as shown in FIGS. 2A and 2B or C-shaped as shown in FIGS. 4A-4B; although other shapes are possible. Referring first to FIG. 2A, a side view of an embodiment of a V-shaped article 10 is shown. The V-shaped glass article 10 includes a glass sheet 12. The glass sheet 12 has a first major surface 14 and a second major surface 16. In a vehicle, the first major surface 14 faces the occupants of the vehicle, and the second major surface 16 is the rear surface of the V-shaped glass article 10 to which a display (e.g., an LED display, OLED display, LCD display, or a plasma display) may be mounted, e.g., using an optically clear adhesive. The second major surface 16 is opposite to the first major surface 14, and the first major surface 14 and the second major surface 16 define a thickness T of the glass sheet 12. The first major surface 14 and the second major surface 16 are joined by a minor surface 18.

As can be seen in FIG. 2A, the glass sheet 12 has a curved region 20 disposed between a first flat section 22a and a second flat section 22b. In embodiments, the curved region 20 has a radius of curvature R that is from 250 mm to a radius that is less than substantially flat or planar (e.g., 10 m). Further, as shown in FIG. 2A, the curved region 20 defines a concave curve, but in other embodiments, the curved region 20 is instead a convex curve. For the V-shaped article 10 of FIG. 2A, an adhesive 24 is applied on the second major surface 16 in the curved region 20. The adhesive 24 attaches a carrier 26 to the glass sheet 12. As can be seen in FIG. 2A, the carrier 26 extends over the entire curved region 20 and at least partially into the flat sections 22a, 22b. The portion of the carrier 26 extending into the flat sections 22a, 22b is shown between the dashed lines labeled "Flat area." As will be discussed more fully below, Applicant has determined a carrier size and thickness designed to minimize the distance that the carrier 26 extends into the flat sections 22a, 22b while also maintaining shape deviation of the glass sheet 12 to within ±0.3 mm.

In embodiments, the adhesive 24 comprises a pressure sensitive adhesive. Exemplary pressure sensitive adhesives suitable for use in the adhesive 24 include at least one of 3M™ VHB™ (available from 3M, St. Paul, MN) or Tesa® (available from tesa SE, Norderstedt, Germany). In embodiments, the adhesive 24 comprises a liquid adhesive. Exemplary liquid adhesives include toughened epoxy, flexible epoxy, acrylics, silicones, urethanes, polyurethanes, and silane modified polymers. In specific embodiments, the liquid adhesive includes one or more toughened epoxies, such as EP21TDCHT-LO (available from Masterbond®, Hackensack, NJ), 3M™ Scotch-Weld™ Epoxy DP460 Off-White (available from 3M, St. Paul, MN). In other embodiments, the liquid adhesive includes one or more flexible epoxies, such as Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125. In still other embodiments, the liquid adhesive includes one or more acrylics, such as LORD® Adhesive 410/Accelerator 19 w/LORD® AP 134 primer, LORD® Adhesive 852/LORD® Accelerator 25 GB (both being available from LORD Corporation, Cary, NC), DELO PUR SJ9356 (available from DELO Industrial Adhesives, Windach, Germany), Loctite® AA4800, Loctite® HF8000. TEROSON® MS 9399, and TEROSON® MS 647-2C (these latter four being available from Henkel AG & Co. KGaA, Düsseldorf, Germany), among others. In yet other embodiments, the liquid adhesive includes one or more urethanes, such as 3M™ Scotch-Weld™ Urethane DP640 Brown and 3M™ Scotch-Weld™ Urethane DP604, and in still further embodiments, the liquid adhesive includes one or more silicones, such as Dow Corning® 995 (available from Dow Corning Corporation, Midland, MI).

Further, in embodiments, a primer can be applied to prepare the surfaces of the glass sheet 12 and carrier 26 for better adhesion. Additionally or instead of applying the primer, carrier 26 may be roughened, in embodiments, to provide better adhesion between the adhesive 24 and the carrier 26. Further, in embodiments, an ink primer may be used in addition to or instead of the primer for metal and glass surfaces. The ink primer helps provide better adhesion between the adhesive 24 and ink covered surfaces (e.g., the pigment design mentioned above for deadfronting applications). An example of a primer is 3M™ Scotch-Weld™ Metal Primer 3901 (available from 3M, St. Paul, MN); other commercially available primers are also suitable for use in the present disclosure and can be selected based on surfaces involved in the bonding and on the adhesive used to create the bond.

Via the adhesive 24 and a cold-forming process (as described below), the carrier 26 holds the glass sheet 12 in the curved shaped. The carrier 26 is also configured to be attached to a frame of a vehicle interior system, such as the vehicle interior systems 100, 200, 300 of FIG. 1. As shown in FIG. 2A, the carrier 26 has a height H corresponding to the dimension of the carrier 26 normal to the glass sheet 12. In embodiments, the height H is from 5 mm to 20 mm, more particularly from 8 mm to 12 mm, and in particular, about 10 mm.

In embodiments, one or more displays 25 are mounted to the second major surface 16 of the glass sheet 12. As mentioned above, the display 25 may, for example, be an LED, OLED, LCD, or plasma display. Further, in embodiments, the display 25 is provided with touch functionality. In embodiments, the display 25 is adhered to the second major surface 16 of the glass sheet 12 using an optically clear adhesive 27.

FIG. 2B shows the rear surface, i.e., the second major surface 16, of the V-shaped glass article 10. In embodiments, the carrier 26 defines a closed or substantially closed shape. For example, as shown in FIG. 2B, the carrier 26 is defines a closed quadrilateral shape having a first longitudinal strip 28, a second longitudinal strip 30, a first lateral strip 32, and a second lateral strip 34. "Longitudinal" as used herein refers to the longest side of the glass sheet 12 and the side opposite to the longest side. In embodiments, the glass sheet 12 is cold-bent along its longitudinal sides. Thus, for the rectangular glass sheet 12 shown in FIG. 2B in which opposite sides have the same length, the longitudinal strips 28, 30 are the strips proximate and extending substantially parallel to both of the longest sides of the glass sheet 12. "Lateral" as used herein refers to the strips 32, 34 of the carrier 26 extending between the longitudinal strips 28, 30. Additionally, in embodiments, the lateral strips 32, 34 extend perpendicular to the curvature of the cold-bent glass sheet 12. In embodiments, the lateral strips 32, 24 connect the longitudinal strips 28, 30 to define a closed shape, and in other embodiments, the lateral strips 32, 34 do not connect the longitudinal strips 28, 30 but still define a substantially closed shape. "Substantially closed shape" as used herein means that the lateral strips 32, 34 are spaced no more than 10 mm, particularly no more than 5 mm, apart (on one or both ends) from the longitudinal strips 28, 30. Returning to the embodiment depicted in FIG. 2B, the strips 28, 30, 32, 34 define a rectangular shape for the carrier 26 in which the first longitudinal strip 28 is substantially parallel to and spatially disposed from the second longitudinal strip 30 and the first lateral strip 32 is substantially parallel to and spatially disposed from the second lateral strip 34.

While the embodiment depicted in FIGS. 2A and 2B includes a glass sheet 12 defining a quadrilateral perimeter, the shape of the glass sheet 12 is not limited to such. In other embodiments, the glass sheet 12 may have a perimeter including curved sides, straight sides, or both curved and straight sides. In any such embodiments, the carrier 26 defines a closed or substantially closed shape across the curved region 20 of the glass article 10 and into the flat sections 22a, 22b.

As will be discussed more fully below, Applicant has found that the four strips provided in a closed or substantially closed shape are the minimum necessary to maintain a shape deviation of within ±0.3 mm in the curved region 20 of the glass sheet for a radius of curvature as low as 250 mm. As shown and discussed in relation to other embodiments, additional longitudinal or lateral strips may be provided to provide further support for the glass sheet 12 and to further reduce the shape deviation.

Besides the number of strips 28, 30, 32, 34, the thickness and location of the strips are also considerations in the design of the carrier 26, especially for the purposes of assuring reliability of the part in operation. In particular, the cold-bent glass article 10 will exert stress on the adhesive 24 based on the resiliency of the glass sheet 12, which will make the glass sheet 12 want to spring back to the planar configuration. Additionally, stress on the adhesive 24 arises from the different thermal expansions of the glass sheet 12 and carrier 26 such that, when exposed to temperature extremes, the carrier 26 tends to expand or contract more than the glass sheet 12, stressing the adhesive 24. Therefore, in order to provide reliable bonding between the glass sheet 12 and the carrier 26, the carrier 26 needs to have a sufficient surface area bonded to the glass sheet 12 in specific areas.

To that end and as mentioned above, the carrier 26 extends at least partially into the flat sections 22a, 22b of the glass sheet 12 such that the longitudinal strips 28, 30 extend across the curved region 20 and into the flat sections 22a, 22b. In embodiments, the longitudinal strips 28, 30 extend 10 mm or less into each of the flat sections 22a, 22b. In other embodiments, the longitudinal strips 28, 30 extend 8 mm or less into the flat sections 22a, 22b, and in still other embodiments, the longitudinal strips 28, 30 extend 5 mm or less, in particular about 4 mm, into the flat sections 22a, 22b. Additionally, in embodiments, the longitudinal strips 28, 30 have a width $W_{long}$ of 2 mm or less, in particular, 1 mm or less, to provide a large display area.

In embodiments, the lateral strips 32, 34 are positioned at the ends of the longitudinal strips 28, 30. In embodiments, the lateral strips 32, 34 have a width $W_{lat}$ that extends from the edge of the longitudinal strips 28, 30 across the boundary between the flat section 22a or 22b and the curved region 20. In embodiments, the lateral strips 32, 34 extend 10 mm or less into the curved region 20. In embodiments, the lateral strips 32, 34 extend 8 mm or less into the curved region 20, and in still other embodiments, the lateral strips 32, 34 extend 5 mm or less, in particular about 4 mm, into the curved region 20. Thus, in embodiments, the lateral strips 32, 34 have a width $W_{lat}$ of 20 mm or less, 16 mm or less, or 10 mm or less, in particular about 8 mm.

Figure 3:
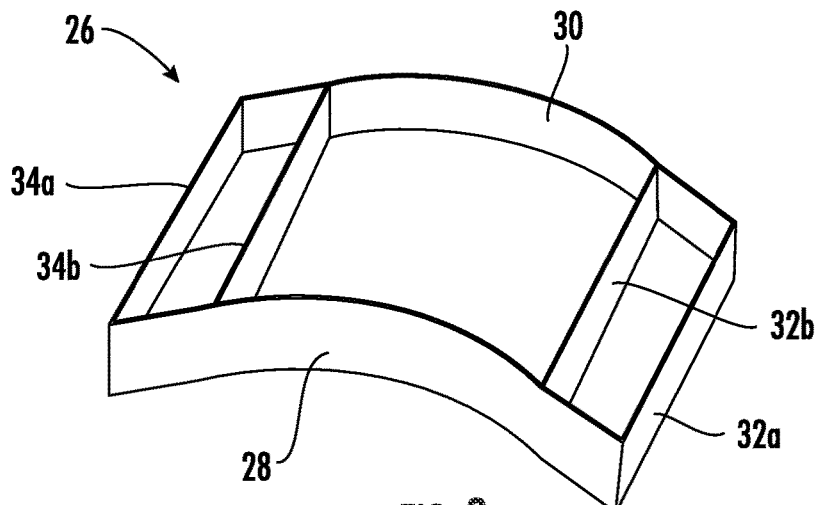
FIG. 3 depicts an embodiment of a carrier having multiple lateral strips, according to an exemplary embodiment.

In other embodiments, a plurality of lateral strips 32, 34 may be provided in which each strip 32, 34 has a width $W_{lat}$ of 2 mm or less, in particular, 1 mm or less. Such an embodiment is depicted in FIG. 3. As can be seen there, each end of the longitudinal strips 28, 30 includes a lateral strip 32a, 34a at each end and another lateral strip 32b, 34b substantially parallel to and spatially disposed from the lateral strips 32a, 32b and located proximate to the boundary between the curved region 20 and the flat sections 22a, 22b.

FIG. 4A depicts an embodiment of a C-shaped glass article 40. The C-shaped glass article 40 also includes a glass sheet 12. As with the V-shaped glass article 10 of FIGS. 2A and 2B, the glass sheet 12 of the C-shaped glass article 40 of FIG. 4A has a first major surface 14 and a second major surface 16 defining a thickness T and being joined by a minor surface 18. The C-shaped glass article 40 also has a curved region 20 and flat sections 22a, 22b. As compared to the V-shaped glass article 10, the C-shaped glass article 40 has a much larger curved region 20 and much smaller flat sections 22a, 22b. As can be seen in FIG. 4A, the carrier 26 is attached to the second major surface 16 with the adhesive 24. Because the curved region 20 is much larger than in the previously discussed embodiment, the longitudinal strips 28, 30 of the carrier 26 extend along substantially the entirety of each longitudinal side as shown in FIG. 4B.

Figure 5A:
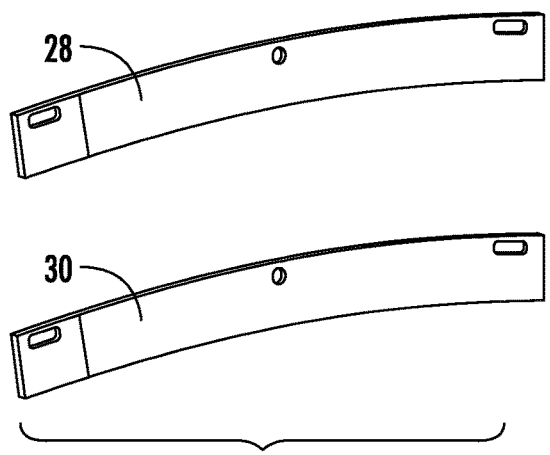
FIG. 5A depicts a comparative example of a carrier for a curved glass article.
Figure 5B:
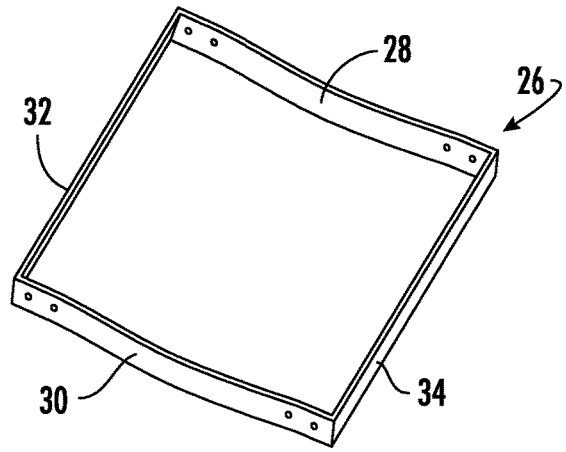
FIGS. 5B-5D depict rectangular carriers for curved glass articles, according to exemplary embodiments.
Figure 5C:
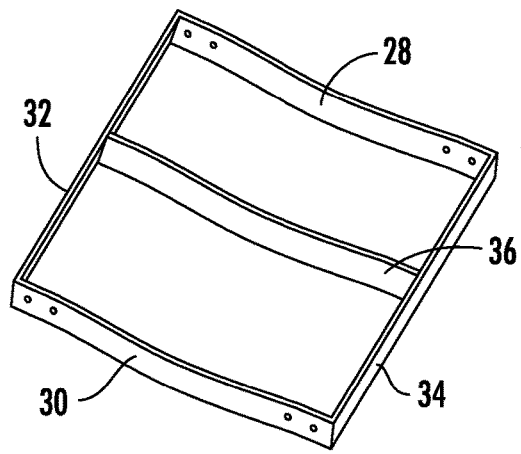
Figure 5D:
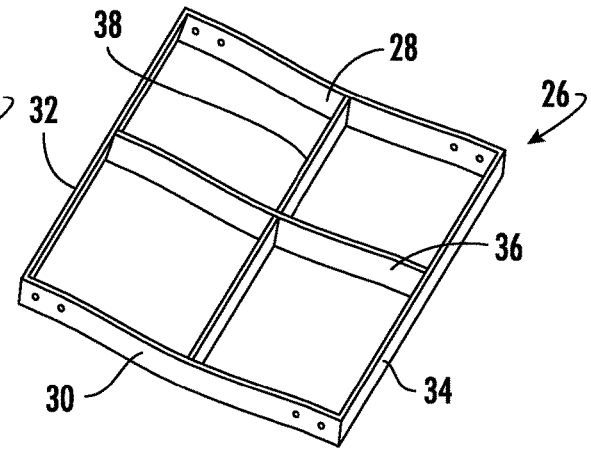

Having described the structure of the glass articles 10, 40, various configurations of the glass articles 10, 40 were investigated experimentally and through simulation. FIGS. 5A-5D depict various configurations of carriers 26 for V-shaped glass articles 10. FIG. 5A depicts an embodiment of a carrier having just two longitudinal strips. FIG. 5B depicts an embodiment of a carrier 26 according to the present disclosure having a rectangular shape with two longitudinal strips 28, 30 and two lateral strips 32, 34. FIG. 5C depicts an embodiment of a carrier 26 according to the present disclosure that is substantially similar to the carrier of FIG. 5B except that the carrier 26 of FIG. 5C has a third longitudinal strip 36 disposed about halfway between the first longitudinal strip 28 and the second longitudinal strip 30. FIG. 5D depicts an embodiment of a carrier 26 according to the present disclosure that is substantially similar to the carrier 26 of FIG. 5C except that the carrier of FIG. 5D includes a third lateral strip 38 disposed about halfway between the first lateral strip 32 and the second lateral strip 34. The third lateral strip 38 intersects with and is substantially perpendicular to the third longitudinal strip 36.

Figure 6A:
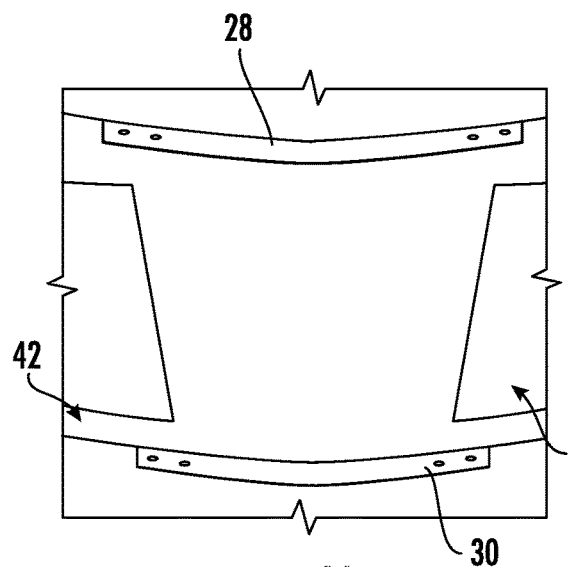
FIG. 6A depicts the carrier of FIG. 5A attached to a glass sheet to form a glass article.
Figure 6B:
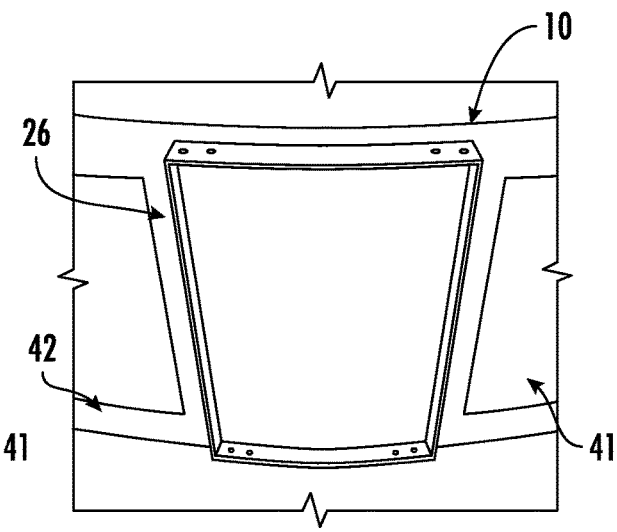
FIGS. 6B-6D depict the rectangular carriers of FIGS. 5B-5D attached to glass sheets to form glass articles, according to exemplary embodiments.
Figure 6C:
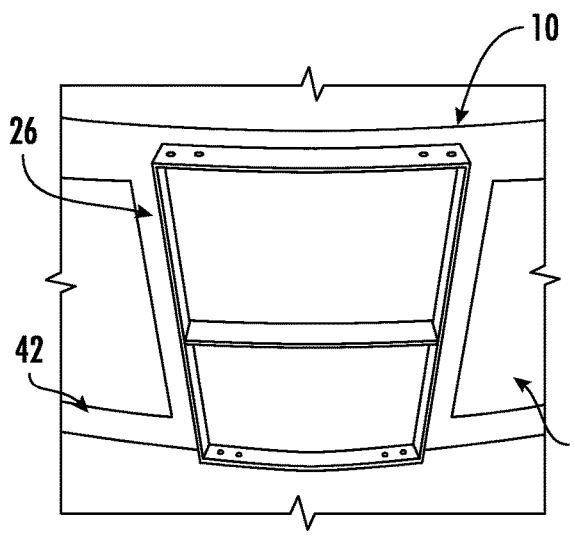
Figure 6D:
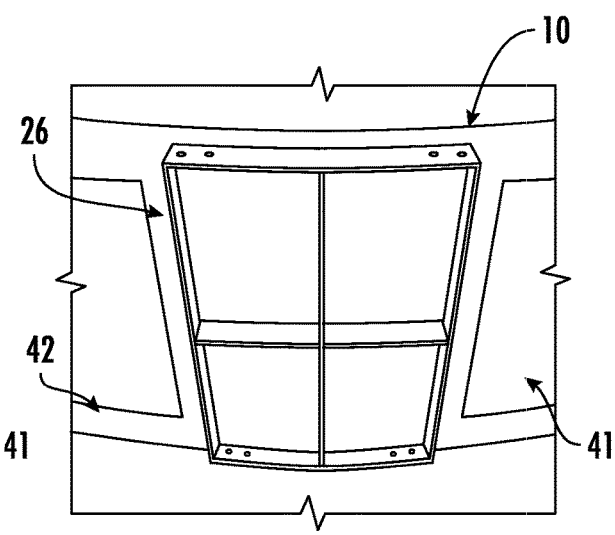

FIG. 6A depicts the carrier of FIG. 5A as attached to the second major surface of a glass sheet. FIGS. 6B-6D depict the carriers 26 of FIGS. 5B-5D, respectively, bonded to the second major surfaces 16 of the glass sheets 12. As can be seen in the comparative example of FIG. 6A and the embodiments according to the present disclosure of FIGS. 6B-6D, the second major surface 16 includes a display region 41 and a mask region 42. A display mounted to the second major surface 16 of the glass sheet 12 can be seen through the display region 41, and the mask region 42 covers the edges of the display, which may include wiring, circuit board, or mounting features for use of the display. In general, the carrier 26 is designed to allow for maximum usage of the display region 41 while still preventing large shape deviations and providing mechanical reliability.

Figure 7:
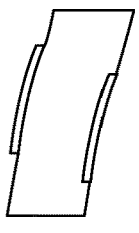
FIG. 7 provides a table comparing the shape deviations for glass articles having the carriers shown in FIGS. 6A-6C.

In that regard, FIG. 7 depicts a table comparing the shape deviations for the comparative example of FIG. 6A and the embodiments of the present disclosure shown in FIGS. 6B and 6C. In FIG. 7, glass articles having a glass sheet of 0.7 mm thickness were considered in which the carrier had a uniform thickness of 1 mm and a height of 10 mm. The table of FIG. 7 includes both numerically modeled shape deviations as well as experimentally determined shape deviations. As will be appreciated from the table, the numerical modeling aligns closely with the experimentally determined results. Referring first to the comparative example including only two longitudinal strips, the strips extended 40 mm into the flat sections of the glass sheet, and a radius of curvature of about 320 mm was formed. As can be seen in the table, the comparative example exhibits significant shape deviation in the center of the glass sheet in the flat sections immediately adjacent to the curved region. In particular, the glass sheet exhibits a bowl-shaped deviation in which the depth of the bowl 0.45 mm or greater at its deepest depth.

When considering the examples according to the present disclosure, the shape deviation is never greater than 0.3 mm either according to the model or to the experimental data, in particular in the flat sections 22a, 22b. For the rectangular embodiment (FIG. 6B), the table of FIG. 7 considered longitudinal strips 28, 30 that extended 18 mm into the flat sections 22a, 22b and a radius of curvature of about 260 mm. The model exhibited essentially no shape deviation, and the experimental data exhibited only a small region that reached 0.3 mm. For the rectangular embodiment with the third longitudinal strip (FIG. 6C), the table of FIG. 7 considered longitudinal strips 28, 30, 36 that extended 18 mm into the flat sections 22a, 22b and a radius of curvature of about 250 mm. In this example, both the model and the experimental data exhibited essentially no shape deviation. Thus, the table of FIG. 7 demonstrates that the rectangular shape of the carrier 26 can prevent shape deviations of greater than 0.3 mm in the glass sheet 12, especially in the flat sections 22a, 22b.

Figure 8:
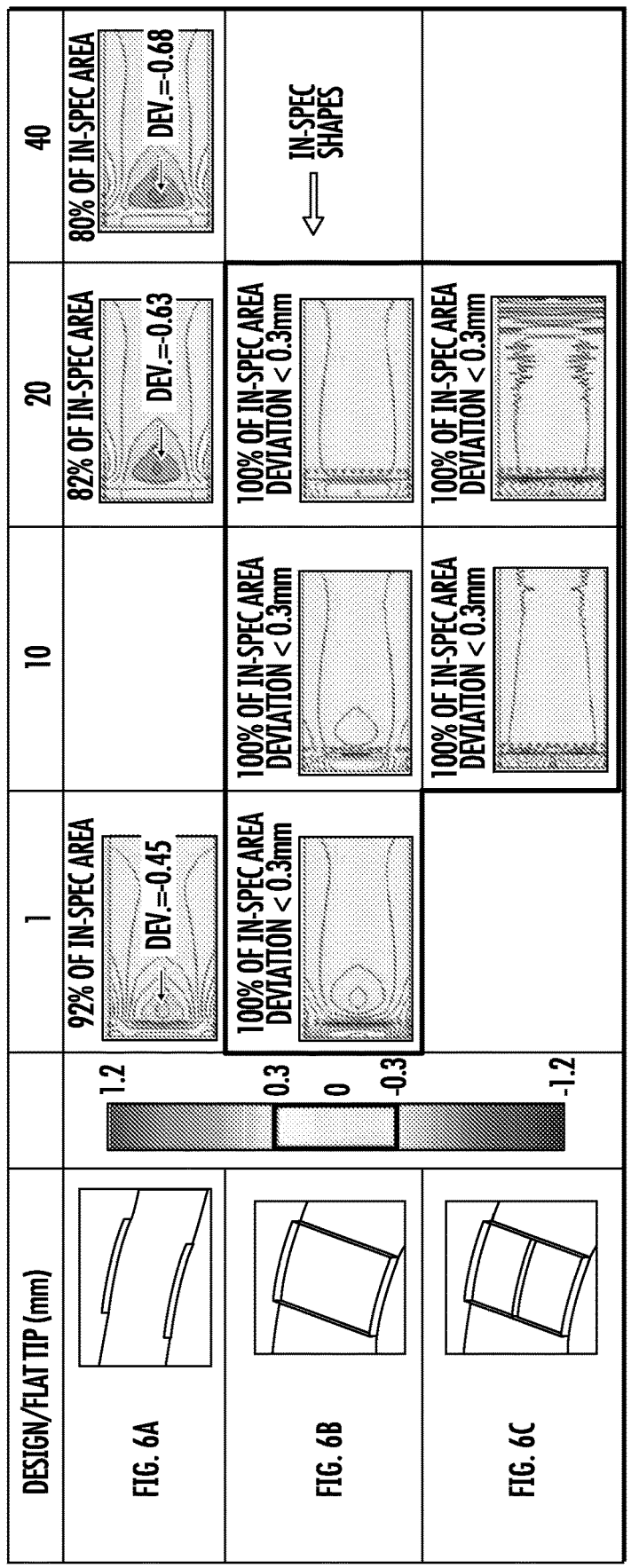
FIG. 8 provides a table comparing the shape deviation for glass articles having the carriers shown in FIGS. 6A-6C for varying degrees of extension into the flat sections of the glass sheet.

To confirm the role that the shape of the carrier had on shape deviation, the extent to which the carrier extended into the flat sections was also investigated using numerical modeling. FIG. 8 depicts a table considering varying degrees to which the carrier extends into flat sections for the comparative example of FIG. 6A and the exemplary embodiments of FIGS. 6B and 6C. Again, the numerical modeling considered glass sheets having a thickness of 0.7 mm. As can be seen, the comparative example was considered for extensions of 1 mm, 20 mm, and 40 mm into the flat sections. As can be seen, the shape deviation was greater as the longitudinal strips of the comparative example extended farther into the flat sections. In order to quantify the amount of the glass sheet that maintained a shape deviation of within +0.3 mm, the metric of "in-spec area" was used, which refers to the percentage of surface area of the glass sheet that had a shape deviation of 0.3 mm or less. For the 40 mm extension, the comparative example exhibited an in-spec area of only 80%, and for the 20 mm extension, the in-spec area was only 82%. The greatest in-spec area for the comparative example was 92% for 1 mm extension into the flat sections. While somewhat counterintuitive that the decreasing extension into the flat area would increase the in-spec area, a glass article having longitudinal strips with no extension into the flat sections or not extending across the entire curved region would still not achieve 100% in-spec area as provided by the embodiments of the carrier 26 according to the present disclosure.

The table of FIG. 8 shows modeled data for the glass articles 10 having carriers 26 as shown in FIGS. 5B and 5C. For the rectangular carrier 26 of FIG. 5B, extensions of 1 mm, 10 mm, and 20 mm into the flat sections were considered. As can be seen in FIG. 8, the in-spec area was 100% for each of these examples. For the rectangular carrier 26 of FIG. 5C, extensions of 10 mm and 20 mm into the flat sections were considered. Again, the in-spec area was 100% for both of these examples as shown in FIG. 8. Thus, considering FIGS. 7 and 8, Applicant found that the shape of the carrier 26 was determinative of the shape deviation. Without wishing to be bound by theory, Applicant believes that the shape deviation is greater for the comparative example because the carrier only provides four points across the width of the glass sheet that are under 4-point bending whereas the additional lateral strips 32, 34 of the disclosed carrier 26 provide 4-point bending across the entire width of the glass sheet 12.

Figure 9:
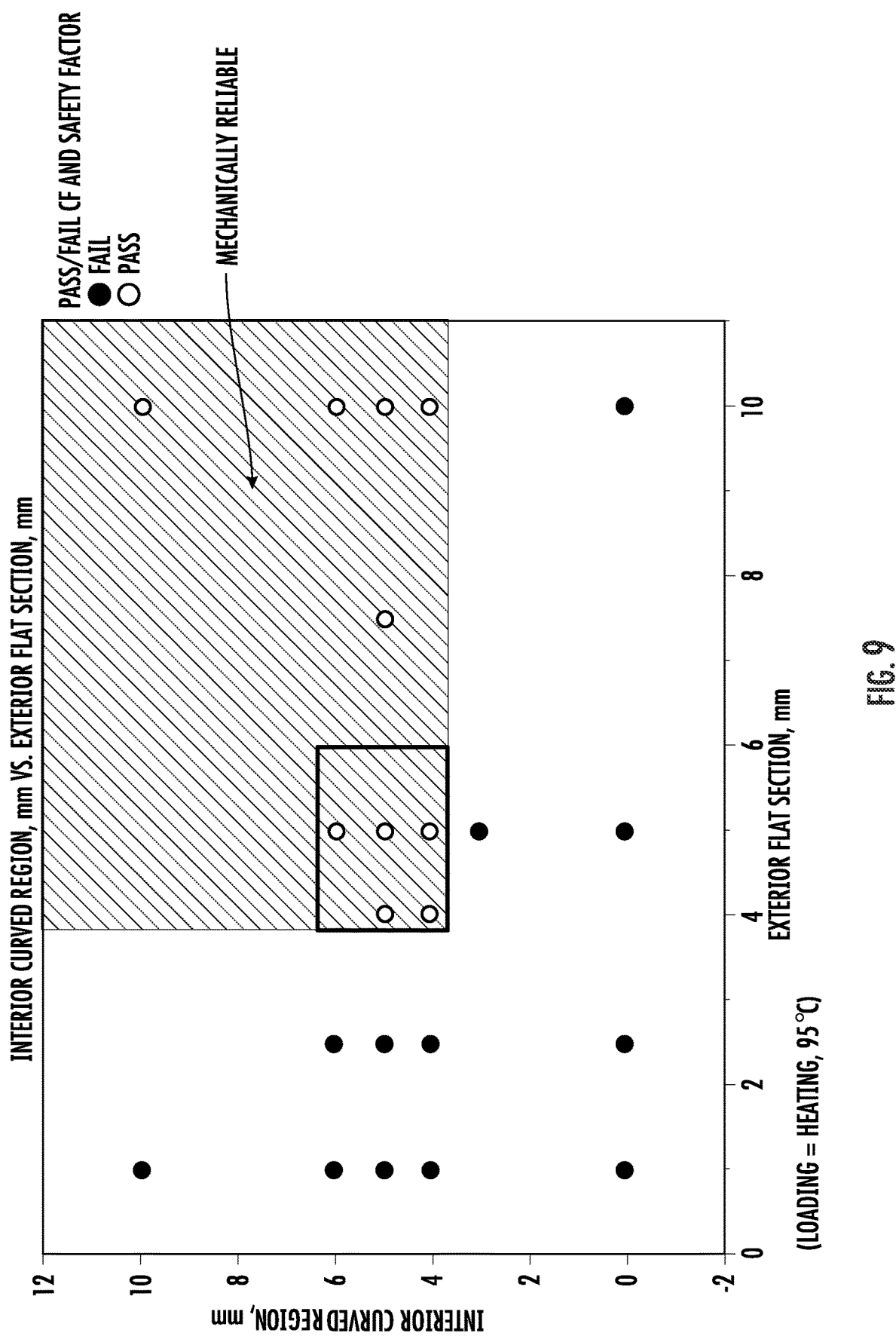
FIG. 9 is a graph showing mechanical reliability of the carrier attachment based on widths of the lateral strips extending in the flat sections and curved region to varying degrees, according to an exemplary embodiment.

As mentioned above, the carrier 26 should not only provide minimal shape deviation for the glass sheet 12, but also, the bond between the carrier 26 and the glass sheet 12 should be mechanically reliable, especially against stresses induced by temperature changes. In order to provide mechanical reliability without sacrificing display area, Applicant investigated the width of the lateral strips 32, 34. FIG. 9 depicts a plot of the width of the lateral strips 32, 34 in the flat sections 22a, 22b (x-axis) versus the width of the lateral strips 32, 34 in the center region 20 (y-axis) for a glass article 10 having a 0.7 mm thick glass sheet 12 bent at a radius of curvature of 250 mm and experiencing thermal stresses associated with a temperature of 95° C. For example, in the graph, a point of (4 mm, 2.5 mm) would correspond to a lateral strip 32, 34 with a width of 6.5 mm extending 4 mm from the boundary between the flat sections 22a, 22b and the curved region 20 into the flat sections 22a, 22b. Such a lateral strip 32, 34 would also extend 2.5 mm into the curved region 20. In FIG. 9, a variety of points for lateral strips 32, 34 extending into the flat sections 22a, 22b and/or into the curved region 20 were considered.

As can be seen for the embodiment depicted (0.7 mm thick glass sheet, rectangular carrier), Applicant has identified a minimum width for the lateral strips 32, 34 in order to provide mechanical reliability for a glass sheet bent at a radius of curvature of 250 mm. In particular, the width $W_{lat}$ is 8 mm with 4 mm in the flat sections 22a, 22b and 4 mm in the curved region 20. A glass article 10 having a carrier 26 with lateral strips 32, 34 having such a width $W_{lat}$ are able to withstand typical stresses associated with cold-forming and with temperature fluctuations, including with a safety factor. The boxed region of FIG. 9 in the "Mechanically Reliable" area provides good compromise between reliability and maximizing display area.

The minimum width $W_{lat}$ for the lateral strips 32, 24 will vary depending on other factors. For instance, for the same radius of curvature, a greater minimum width $W_{lat}$ is expected to be necessary for a relatively thicker glass sheet 12 than for a relatively thinner glass sheet 12, and for the same radius of curvature and glass thickness, a smaller minimum width $W_{lat}$ is expected to be necessary if additional reinforcing features, such as a third longitudinal strip 36 or third lateral strip 38, are included in the carrier 26. Additionally, for a greater radius of curvature, the width $W_{lat}$ may be smaller (e.g., all else being equal, the width $W_{lat}$ may be less for a glass article 10 having a radius of curvature of 400 mm as opposed to 250 mm).

Figure 10A:
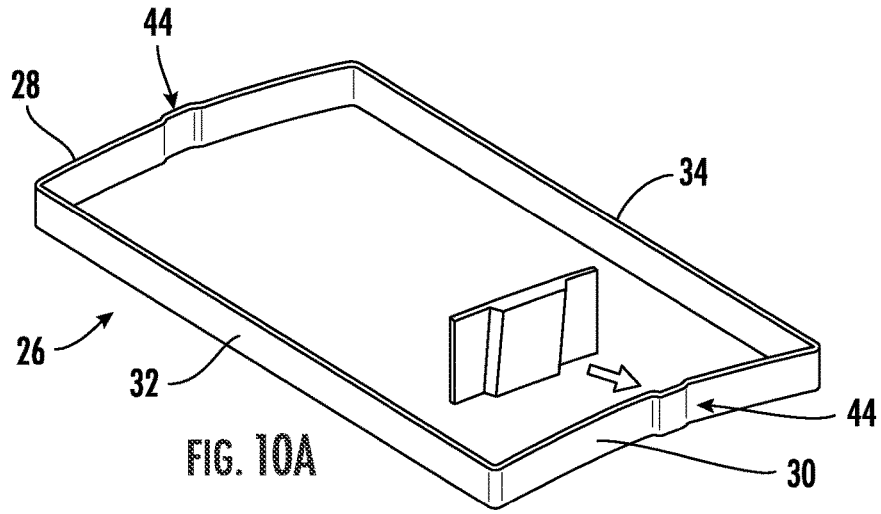
FIGS. 10A and 10B depict exemplary methods for forming the carrier, according to exemplary embodiments.
Figure 10B:
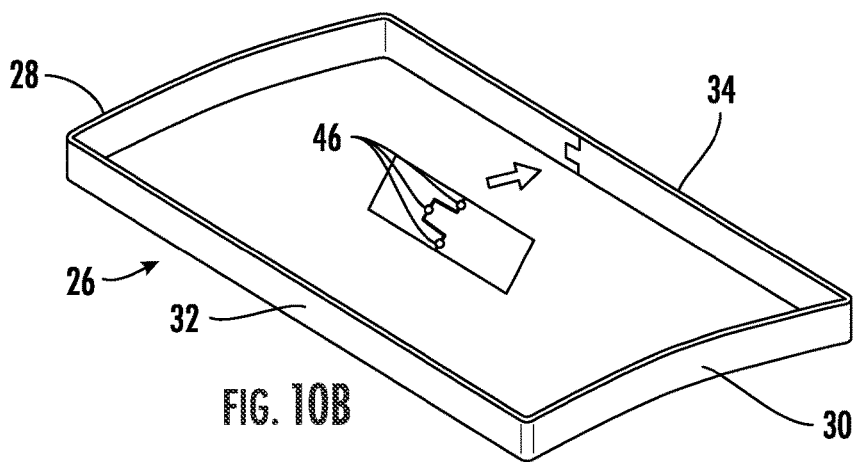

FIGS. 10A and 10B depict exemplary embodiments for forming a rectangular carrier 26. In embodiments of a rectangular carrier, the carrier 26 is formed from a single strip of material, bent into the rectangular configuration, and welded. The weld can be made with or without an overlap 44. FIG. 10A depicts an embodiment of the carrier 26 formed with an overlap 44 at the location of the weld. FIG. 10B depicts an embodiment of the carrier 26 formed without an overlap. In the embodiment of FIG. 10B, the ends of the strip are complementary and interlocking. The ends are interlocked and multiple welding points 46 are made to join the ends. In embodiments in which the carrier 26 is formed from a strip, the strips can be, e.g., laser cut, molded, or machined. In embodiments, additional longitudinal or lateral strips can be joined to the rectangular carrier 26 by spot welding the strips to the carrier after forming the rectangle. In other embodiments, carrier 26 can be made by die casting strips used to form the carrier 26. In such embodiments, additional longitudinal or lateral strips can be formed during die casting or welded to the rectangular carrier after die casting.

Figure 11:
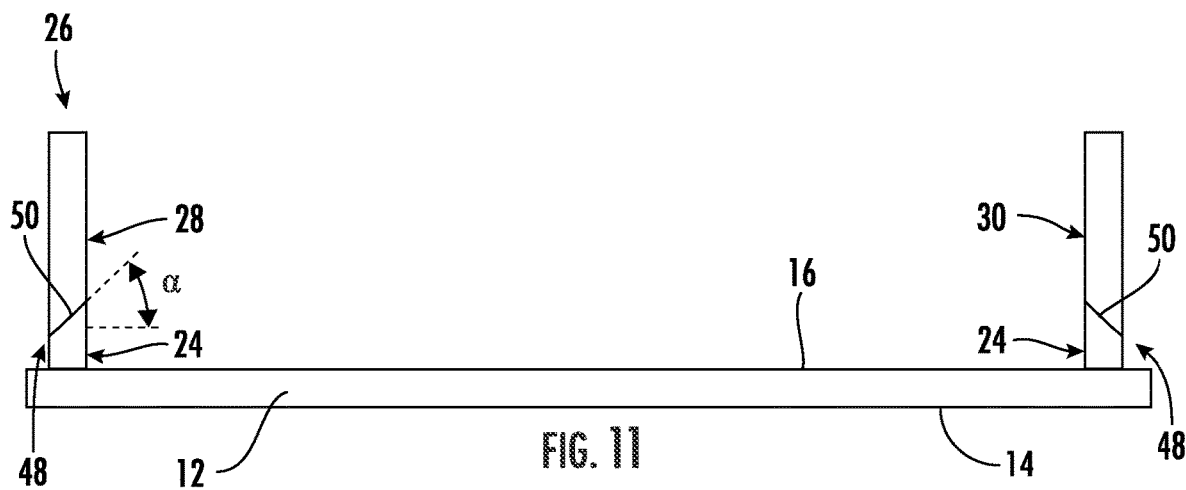
FIG. 11 depicts a carrier having a chamfered edge, according to exemplary embodiments.

FIG. 11 depicts a further modification of the carrier 26 than can be made to lower stress in the adhesive 24. The modification involves chamfering at least the longitudinal strips 28, 30 of the carrier 26. Although, in other embodiments, all the strips 28, 30, 32, 34 may be chamfered. In the embodiment depicted, the longitudinal strips 28, 30 of the carrier 26 have a depending edge 48 that is formed or machined to provide an angled surface 50. The angle α of the surface is from 20° to 60°, more particularly from 30° to 45°, and in particular about 34° (e.g., 33° to) 35°. Further, the chamfering faces the interior of the carrier 26, i.e., the angled surfaces 50 of each longitudinal strip 28, 30 face each other.

Further, in embodiments, the carriers 26 of both the V-shaped glass article 10 and the C-shaped glass article 40 are made from a material having a CTE that matches the CTE of the glass sheet 12. The matching CTE reduces the thermal stress developed in the adhesive 24 as a result of thermal expansion differences between the glass sheet 12 and the carrier 26. In general, the glass sheet 12 will have a CTE of approximately 8 $(10^{-6})/°$ C. Thus, in embodiments, the carrier 26 is selected to have a CTE of between about 8 $(10^{-6})/°$ C. and about 40 $(10^{-6})/°$ C., more particularly between about 8 $(10^{-6})/°$ C. and about 22 $(10^{-6})/°$ C., even more particularly between about 8 $(10^{-6})/°$ C. and about 15 $(10^{-6})/°$ C., and most particularly between about 8 $(10^{-6})/°$ C. and about 15 $(10^{-6})/°$ C. In embodiments, the carrier 26 can be made of any material having a CTE between 8 $(10^{-6})/°$ C. and 40 $(10^{-6})/°$ C. when the adhesive is selected to have a bonding strength greater than the combined shear stress and bending stress. Thus, a variety of metal materials can be used, including steel (especially stainless steel, galvanized steel, and other corrosion-resistant steels), iron-nickel alloys, aluminum and its alloys, and magnesium and its alloys. Further, the carrier material can be a plastic or a composite material, such as a fiber-reinforced plastic composite material having, e.g., fibers (such as glass fibers, carbon fibers, aramid fibers, and/or graphite fibers) embedded in an epoxy resin (such as epoxy resin, polycarbonate, acrylic, polyester, polyetherketoneketone (PEKK), polycarbonate/acrylonitrile butadiene styrene (PC/ABS), polypropylene, and/or phenolic resin). In this way the carrier material and adhesive can be selected from a wide variety of materials, allowing for design and economic flexibility.

As mentioned briefly above, the glass sheet 12 is joined to the carrier 26 via cold-forming methods. By cold-forming, it is meant that the curved region 20 is introduced to the glass sheet 12 at a temperature below the softening temperature of the glass. More particularly, cold-forming takes place at below 200° C., below 100° C., or even at room temperature. During cold forming, pressure is applied to the glass sheet 12 to bring the glass sheet 12 into conformity with the shape of the carrier 26. Pressure may be applied in a variety of different ways, such as vacuum pressure, a mechanical press, rollers, etc. In embodiments, pressure is maintained on the glass sheet 12 until the adhesive 24 cures (at least enough to prevent debonding of the glass sheet 12 from the carrier 26). Thereafter, the glass sheet 12 is bonded to the carrier 26, and the glass article 10, 40 may be shipped and/or installed as part of a vehicle interior system.

Figure 12:
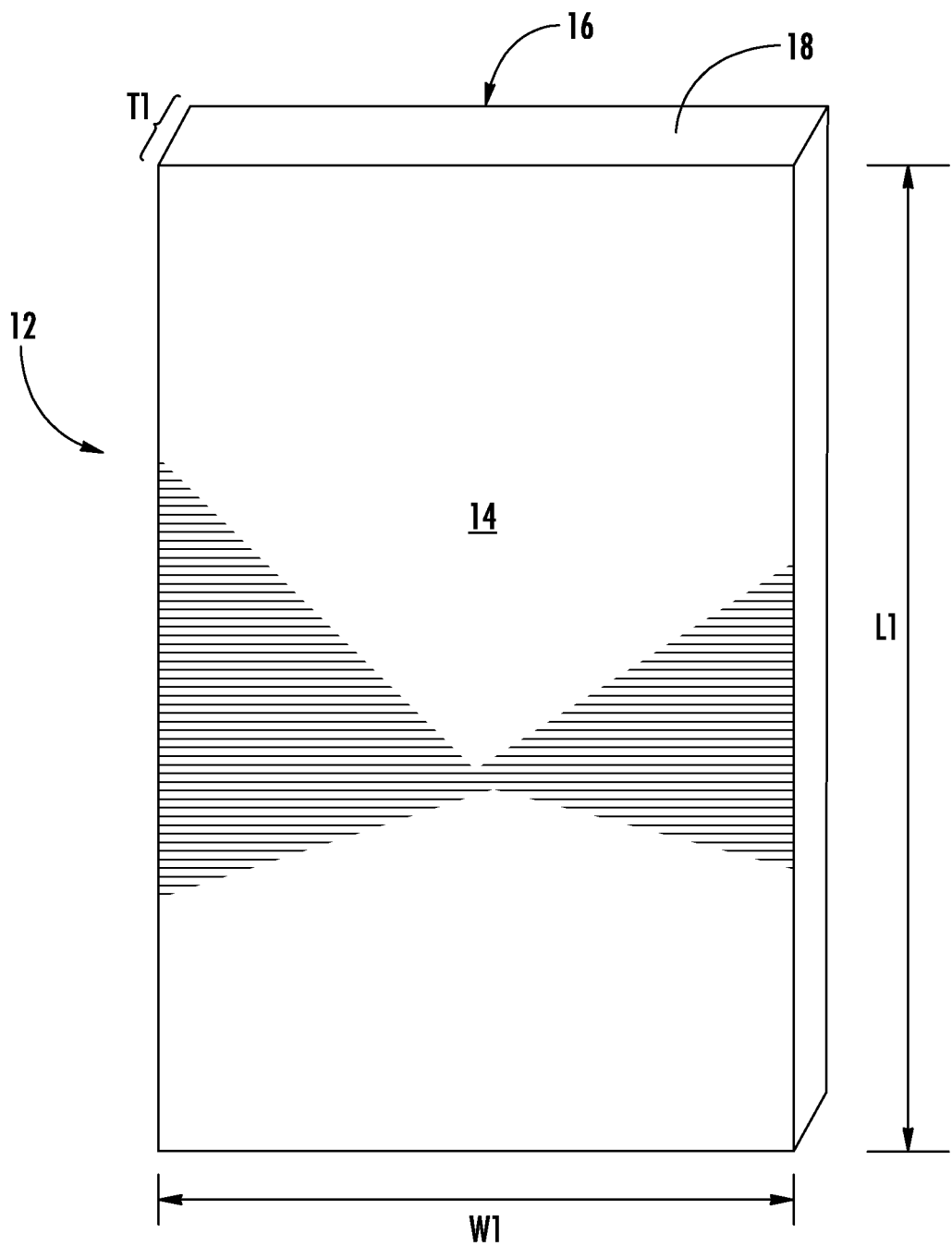
FIG. 12 depicts a glass sheet suitable for cold-forming on a carrier to produce a glass articles, according to an exemplary embodiment.

In the following paragraphs, various geometrical properties of the glass sheet 12 as well as compositions of the glass sheet are provided. Referring to FIG. 12, the glass sheet 12 has a thickness T1 that is substantially constant and is defined as a distance between the first major surface 14 and the second major surface 16. In various embodiments, T1 may refer to an average thickness or a maximum thickness of the glass sheet. In addition, the glass sheet 12 includes a width W1 defined as a first maximum dimension of one of the first or second major surfaces 14, 16 orthogonal to the thickness T1, and a length L1 defined as a second maximum dimension of one of the first or second major surfaces 14, 16 orthogonal to both the thickness and the width. In other embodiments, W1 and L1 may be the average width and the average length of the glass sheet 12, respectively, and in other embodiments, W1 and L1 may be the maximum width and the maximum length of the glass sheet 12, respectively (e.g., for glass sheets 14 having a variable width or length).

In various embodiments, thickness T1 is 2 mm or less and specifically is 0.3 mm to 1.1 mm. For example, thickness T1 may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the T1 falls within any one of the exact numerical ranges set forth in this paragraph.

In various embodiments, width W1 is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W1 falls within any one of the exact numerical ranges set forth in this paragraph.

In various embodiments, length L1 is in a range from about 5 cm to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L1 falls within any one of the exact numerical ranges set forth in this paragraph.

In various embodiments, one or more radius of curvature (e.g., R shown in FIGS. 2A and 4A) of glass sheet 12 is about 20 mm or greater. For example, R may be in a range from about 20 mm to about 10,000 mm, from about 30 mm to about 10,000 mm, from about 40 mm to about 10,000 mm, from about 50 mm to about 10,000 mm, from about 60 mm to about 10,000 mm, from about 70 mm to about 10,000 mm, from about 80 mm to about 10,000 mm, from about 90 mm to about 10,000 mm, from about 100 mm to about 10,000 mm, from about 120 mm to about 10,000 mm, from about 140 mm to about 10,000 mm, from about 150 mm to about 10,000 mm, from about 160 mm to about 10,000 mm, from about 180 mm to about 10,000 mm, from about 200 mm to about 10,000 mm, from about 220 mm to about 10,000 mm, from about 240 mm to about 10,000 mm, from about 250 mm to about 10,000 mm, from about 260 mm to about 10,000 mm, from about 270 mm to about 10,000 mm, from about 280 mm to about 10,000 mm, from about 290 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 900 mm to about 10,000 mm, from about 950 mm to about 10,000 mm, from about 1000 mm to about 10,000 mm, from about 1250 mm to about 10,000 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 600 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, or from about 20 mm to about 250 mm. In other embodiments, R1 falls within any one of the exact numerical ranges set forth in this paragraph.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, glass sheet 12 may be strengthened. In one or more embodiments, glass sheet 12 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, glass sheet 12 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In various embodiments, glass sheet 12 may be chemically strengthened by ion exchange. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and CS of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass sheet. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. Central tension or CT is the maximum tensile stress and is measured by SCALP.

In one or more embodiments, the glass sheet may be strengthened to exhibit a DOC that is described as a fraction of the thickness T1 of the glass sheet 12 (as described herein). For example, in one or more embodiments, the DOC may be equal to or greater than about 0.05T1, equal to or greater than about 0.1T1, equal to or greater than about 0.11T1, equal to or greater than about 0.12T1, equal to or greater than about 0.13T1, equal to or greater than about 0.14T1, equal to or greater than about 0.15T1, equal to or greater than about 0.16T1, equal to or greater than about 0.17T1, equal to or greater than about 0.18T1, equal to or greater than about 0.19T1, equal to or greater than about 0.2T1, equal to or greater than about 0.21T1. In some embodiments, the DOC may be in a range from about 0.08T1 to about 0.25T1, from about 0.09T1 to about 0.25T1, from about 0.18T1 to about 0.25T1, from about 0.11T1 to about 0.25T1, from about 0.12T1 to about 0.25T1, from about 0.13T1 to about 0.25T1, from about 0.14T1 to about 0.25T1, from about 0.15T1 to about 0.25T1, from about 0.08T1 to about 0.24T1, from about 0.08T1 to about 0.23T1, from about 0.08T1 to about 0.22T1, from about 0.08T1 to about 0.21T1, from about 0.08T1 to about 0.2T1, from about 0.08T1 to about 0.19T1, from about 0.08T1 to about 0.18T1, from about 0.08T1 to about 0.17T1, from about 0.08T1 to about 0.16T1, or from about 0.08T1 to about 0.15T1. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass sheet may have a CS (which may be found at the surface or a depth within the glass sheet) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass sheet may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass sheet 12 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass sheet 12 may be made from any glass composition falling with any one of the exact numerical ranges discussed above.

Aspect (1) of this disclosure pertains to a curved glass article, comprising: a glass sheet comprising a first major surface and a second major surface opposite to the first major surface, the glass sheet being bent into a curved configuration defining a curved region disposed between a first flat section and a second flat section, the curved region comprising a radius of curvature of at least 250 mm; a carrier adhered to the second major surface of the glass sheet and configured to maintain the glass sheet in the curved configuration, the carrier comprising a first longitudinal strip, a second longitudinal strip, a first lateral strip, and a second lateral strip, wherein the first longitudinal strip is spaced apart from the second longitudinal strip, wherein the first longitudinal strip and the second longitudinal strip define the radius of curvature of the curved region, wherein the first lateral strip is spaced apart from the second lateral strip, and wherein the first lateral strip and the second lateral strip extend between the first longitudinal strip to the second longitudinal strip; wherein the glass sheet deviates 0.3 mm or less from planar in the first flat section and in the second flat section; wherein the first longitudinal strip and the second longitudinal strip each have a width $W_{long}$ of 2 mm or less; and wherein the first lateral strip and the second lateral strip each have a width $W_{lat}$ of 20 mm or less, wherein at least a portion of the width $W_{lat}$ of the first lateral strip is located in the curved region and in first flat section, and wherein at least a portion of the width $W_{lat}$ of the second lateral strip is located in the curved region and in the second flat section.

Aspect (2) of this disclosure pertains to the curved glass article of Aspect (1), wherein no more than 10 mm of the width $W_{lat}$ of the first lateral strip and of the second lateral strip is located in the first flat section or the second flat section, respectively.

Aspect (3) of this disclosure pertains to the curved glass article of Aspect (1) or Aspect (2), wherein the carrier further comprises a third longitudinal strip disposed between the first longitudinal strip and the second longitudinal strip.

Aspect (4) of this disclosure pertains to the curved glass article of Aspect (3), wherein the carrier further comprises a third lateral strip disposed between the first lateral strip and the second lateral strip and wherein the third lateral strip intersects the third longitudinal strip.

Aspect (5) of this disclosure pertains to the curved glass article of any one of Aspects (1) through (4), wherein the carrier extends into the first flat section and into the second flat section 5 mm or less.

Aspect (6) of this disclosure pertains to the curved glass article of any one of Aspects (1) through (5), wherein the carrier comprises a height extending normal to the glass sheet and wherein the height is 20 mm or less.

Aspect (7) of this disclosure pertains to the curved glass article of any one of Aspects (1) through (6), wherein the first longitudinal strip and the second longitudinal strip each comprise a chamfered edge and wherein the chamfered edge comprises an angle of from 20° to 60°.

Aspect (8) of this disclosure pertains to the curved glass article of any one of Aspects (1) through (7), wherein the first lateral strip and the second lateral strip are each connected to the first longitudinal strip and the second longitudinal strip to define a closed shape.

Aspect (9) of this disclosure pertains to the curved glass article of any one of Aspects (1) through (8), wherein the first lateral strip and the second lateral strip do not extend an entire distance between the first longitudinal strip and the second longitudinal strip to define a substantially closed shape.

Aspect (10) of this disclosure pertains to the curved glass article of any one of Aspects (1) through (9), wherein the glass sheet comprises a V-shaped or a C-shaped cross-section in the curved configuration.

Aspect (11) of this disclosure pertains to the curved glass article of any one of Aspects (1) through (10), wherein the width $W_{long}$ of the first longitudinal strip and of the second longitudinal strip is about 1 mm.

Aspect (12) of this disclosure pertains to the curved glass article of any one of Aspects (1) through (11), wherein the glass sheet comprises at least one of soda lime glass, aluminosilicate glass, borosilicate glass, boroaluminosilicate glass, alkali-containing aluminosilicate glass, alkali-containing borosilicate glass, and alkali-containing boroaluminosilicate glass.

Aspect (13) of this disclosure pertains to the curved glass article of any one of Aspects (1) through (12), wherein the glass sheet has a thickness of from 0.4 mm to 2.0 mm.

Aspect (14) of this disclosure pertains to the curved glass article of any one of Aspects (1) through (13), wherein at least one of the first major surface or the second major surface comprises a surface treatment.

Aspect (15) of this disclosure pertains to the curved glass article of Aspect (14), wherein the surface treatment is at least one of a a pigment design, an anti-glare coating, an anti-reflective coating, and easy-to-clean coating.

Aspect (16) of this disclosure pertains to the curved glass article of any one of Aspects (1) through (15), further comprising at least one display mounted to the second major suface of the glass sheet.

Aspect (17) of this disclosure pertains to the curved glass article of Aspect (16), wherein the at least one display comprises at least one of an light-emitting diode display, an organic light-emitting diode display, a liquid crystal display, or plasma display.

Aspect (18) of this disclosure pertains to a curved glass article, comprising: a glass sheet comprising a first major surface and a second major surface opposite to the first major surface, the glass sheet being bent into a curved configuration defining a curved region disposed between a first flat section and a second flat section, the curved region comprising a radius of curvature of at least 250 mm; a carrier adhered to the second major surface of the glass sheet and configured to maintain the glass sheet in the curved configuration, the carrier comprising a first longitudinal strip, a second longitudinal strip, a first lateral strip, a second lateral strip, a third lateral strip, and a fourth lateral strip, wherein the first longitudinal strip is spaced apart from the second longitudinal strip, wherein the first longitudinal strip and the second longitudinal strip define the radius of curvature of the curved region, and wherein the first lateral strip, the second lateral strip, the third lateral strip, and the fourth lateral strip extend between the first longitudinal strip to the second longitudinal strip; wherein the glass sheet deviates 0.3 mm or less from planar in the first flat section and in the second flat section; wherein each of the longitudinal and lateral strips has a width of 2 mm or less; wherein the first lateral strip is disposed in the first flat section, the second lateral strip and the third lateral strip are disposed in the curved region, and the fourth lateral strip is disposed in the second flat section.

Aspect (19) of this disclosure pertains to the curved glass article of Aspect (18), wherein the carrier extends into the first flat section and into the second flat section 10 mm or less.

Aspect (20) of this disclosure pertains to the curved glass article of Aspect (18) or Aspect (19), wherein the carrier comprises a height extending normal to the glass sheet and wherein the height is 20 mm or less.

Aspect (21) of this disclosure pertains to the curved glass article of any one of Aspects (18) through (20), wherein the first longitudinal strip and the second longitudinal strip each comprise a chamfered edge and wherein the chamfered edge comprises an angle of from 20° to 60°.

Aspect (22) of this disclosure pertains to the curved glass article of any one of Aspects (18) through (21), wherein at least two of the first lateral strip, the second lateral strip, the third lateral strip, and the fourth lateral strip are connected to the first longitudinal strip and to the second longitudinal strip to define a closed shape.

Aspect (23) of this disclosure pertains to the curved glass article of any one of Aspects (18) through (21), wherein none of the first lateral strip, the second lateral strip, the third lateral strip, or the fourth lateral strip extend an entire distance between the first longitudinal strip and the second longitudinal strip to define a substantially closed shape.

Aspect (24) of this disclosure pertains to the curved glass article of any one of Aspects (18) through (23), wherein the glass sheet comprises a V-shaped or a C-shaped cross-section in the curved configuration.

Aspect (25) of this disclosure pertains to the curved glass article of any one of Aspects (18) through (24), wherein the width of each of the lateral strips and of the longitudinal strips is about 1 mm.

Aspect (26) of this disclosure pertains to the curved glass article of any one of Aspects (18) through (25), wherein the glass sheet comprises at least one of soda lime glass, aluminosilicate glass, borosilicate glass, boroaluminosilicate glass, alkali-containing aluminosilicate glass, alkali-containing borosilicate glass, and alkali-containing boroaluminosilicate glass.

Aspect (27) of this disclosure pertains to the curved glass article of any one of Aspects (18) through (26), wherein the glass sheet has a thickness of from 0.4 mm to 2.0 mm between the first major surface and the second major surface.

Aspect (28) of this disclosure pertains to the curved glass article of any one of Aspects (18) through (27), wherein at least one of the first major surface or the second major surface comprises a surface treatment.

Aspect (29) of this disclosure pertains to the curved glass article of Aspect (28), wherein the surface treatment is at least one of a pigment design, an anti-glare treatment, an anti-reflective coating, and easy-to-clean coating.

Aspect (30) of this disclosure pertains to the curved glass article of any one of Aspects (18) through (29), further comprising at least one display mounted to the second major suface of the glass sheet.

Aspect (31) of this disclosure pertains to the curved glass article of Aspect (30), wherein the at least one display comprises at least one of an light-emitting diode display, an organic light-emitting diode display, a liquid crystal display, or plasma display.

Aspect (32) of this disclosure pertains to a method of preparing a curved glass article, comprising: bending a glass sheet into conformity with a carrier comprising a curvature having a radius of curvature of at least 250 mm, wherein the bending is performed at a temperature of 200° C. or less, wherein the glass sheet comprises a first major surface and a second major surface, the second major surface being opposite to the first major surface, wherein the carrier comprises a first longitudinal strip, a second longitudinal, and at least two lateral strips, wherein the at least two lateral strips extend between the first longitudinal strip and the second longitudinal strip, and wherein upon bending the glass sheet comprises a curved region disposed between a first flat section and a section flat section; and adhering the glass sheet to the carrier so as to provide a curved glass article having a shape deviation of ±0.3 mm in the flat sections; wherein the first longitudinal strip and the second longitudinal strip each have a width $W_{long}$ of 2 mm or less; and wherein a first lateral strip of the at least two lateral strips is located at least partially in the first flat section and a second lateral strip of the at least two lateral strips is located at least partially in the second flat section.

Aspect (33) of this disclosure pertains to the method of Aspect (32), wherein each of the first lateral strip and the second lateral strip comprises a width $W_{lat}$ of 20 mm or less.

Aspect (34) of this disclosure pertains to the method of Aspect (33), wherein at least 10 mm or less of the width $W_{lat}$ of the first lateral strip and of the second lateral strip is located in the first flat section and in the second flat section, respectively.

Aspect (35) of this disclosure pertains to the method of any one of Aspects (32) through (34), wherein the carrier further comprises a third longitudinal strip disposed between the first longitudinal strip and the second longitudinal strip.

Aspect (36) of this disclosure pertains to the method of Aspect (35), wherein the at least two lateral strips comprises a third lateral strip disposed between the first lateral strip and the second lateral strip and wherein the third lateral strip intersects with the third longitudinal strip.

Aspect (37) of this disclosure pertains to the method of Aspect (32), wherein the at least two lateral strips comprises a third lateral strip and a fourth lateral strip, wherein the first lateral strip is disposed in the first flat section, the second lateral strip and the third lateral strip are disposed in the curved region, and the fourth lateral strip is disposed in the second flat section.

Aspect (38) of this disclosure pertains to the method of any one of Aspects (32) through (37), wherein the carrier extends into the first flat section and into the second flat section 10 mm or less.

Aspect (39) of this disclosure pertains to the method of any one of Aspects (32) through (38), wherein the carrier comprises a height extending normal to the glass sheet and wherein the height is 20 mm or less.

Aspect (40) of this disclosure pertains to the method of any one of Aspects (32) through (39), wherein the first longitudinal strip and the second longitudinal strip each comprise a chamfered edge and wherein the chamfered edge comprises an angle of from 20° to 60°.

Aspect (41) of this disclosure pertains to the method of any one of Aspects (32) through (40), wherein at least two of the at least two lateral strips are connected to the first longitudinal strip and to the second longitudinal strip to define a closed shape.

Aspect (42) of this disclosure pertains to the method of any one of Aspects (32) through (40), wherein none of the at least two lateral strips extends an entire distance between the first longitudinal strip and the second longitudinal strip to define a substantially closed shape.

Aspect (43) of this disclosure pertains to the method of any one of Aspects (32) through (42), wherein the glass sheet comprises a V-shaped or a C-shaped cross-section in the curved configuration.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A curved glass article, comprising:
a glass sheet comprising a first major surface and a second major surface opposite to the first major surface, the glass sheet being bent into a curved configuration defining a curved region disposed between a first flat section and a second flat section, the curved region comprising a radius of curvature of at least 250 mm;
a carrier adhered to the second major surface of the glass sheet and configured to maintain the glass sheet in the curved configuration, the carrier comprising a first longitudinal strip, a second longitudinal strip, a first lateral strip, and a second lateral strip, wherein the first longitudinal strip is spaced apart from the second longitudinal strip, wherein the first longitudinal strip and the second longitudinal strip define the radius of curvature of the curved region, wherein the first lateral strip is spaced apart from the second lateral strip, and wherein the first lateral strip and the second lateral strip extend between the first longitudinal strip to the second longitudinal strip, wherein the carrier is adhered to the second major surface by an adhesive that is bonded to the carrier and the glass sheet;
wherein the glass sheet deviates 0.3 mm or less from planar in the first flat section and in the second flat section;
wherein the first longitudinal strip and the second longitudinal strip each have a width $W_{long}$ of 2 mm or less;
wherein the first lateral strip and the second lateral strip each have a width $W_{lat}$ of 20 mm or less, wherein at least a portion of the width $W_{lat}$ of the first lateral strip is located in the curved region and in first flat section, and wherein at least a portion of the width $W_{lat}$ of the second lateral strip is located in the curved region and in the second flat section, and wherein no more than 10 mm of the width $W_{lat}$ of the first lateral strip and of the second lateral strip is located in the first flat section or the second flat section, respectively.

2. The curved glass article of claim 1, wherein the carrier further comprises a third longitudinal strip disposed between the first longitudinal strip and the second longitudinal strip.

3. The curved glass article of claim 2, wherein the carrier further comprises a third lateral strip disposed between the first lateral strip and the second lateral strip and wherein the third lateral strip intersects the third longitudinal strip.

4. The curved glass article of claim 1, wherein the carrier extends into the first flat section and into the second flat section 5 mm or less.

5. The curved glass article of claim 1, wherein the carrier comprises a height extending normal to the glass sheet and wherein the height is 20 mm or less.

6. The curved glass article of claim 1, wherein the first longitudinal strip and the second longitudinal strip each comprise a chamfered edge and wherein the chamfered edge comprises an angle of from 20° to 60°.

7. The curved glass article of claim 1, wherein the first lateral strip and the second lateral strip are each connected to the first longitudinal strip and the second longitudinal strip to define a closed shape.

8. The curved glass article of claim 1, wherein the first lateral strip and the second lateral strip do not extend an entire distance between the first longitudinal strip and the second longitudinal strip to define a substantially closed shape.

9. The curved glass article of claim 1, wherein the glass sheet comprises a V-shaped or a C-shaped cross-section in the curved configuration.

10. A curved glass article, comprising:
   a glass sheet comprising a first major surface and a second major surface opposite to the first major surface, the glass sheet being bent into a curved configuration defining a curved region disposed between a first flat section and a second flat section, the curved region comprising a radius of curvature of at least 250 mm;
   a carrier adhered to the second major surface of the glass sheet and configured to maintain the glass sheet in the curved configuration, the carrier comprising a first longitudinal strip, a second longitudinal strip, a first lateral strip, a second lateral strip, a third lateral strip, and a fourth lateral strip, wherein the first longitudinal strip is spaced apart from the second longitudinal strip, wherein the first longitudinal strip and the second longitudinal strip define the radius of curvature of the curved region, and wherein the first lateral strip, the second lateral strip, the third lateral strip, and the fourth lateral strip extend between the first longitudinal strip to the second longitudinal strip, wherein the carrier is adhered to the second major surface by an adhesive that is bonded to the carrier and the glass sheet;
   wherein the glass sheet deviates 0.3 mm or less from planar in the first flat section and in the second flat section;
   wherein each of the longitudinal and lateral strips has a width of 2 mm or less;
   wherein the first lateral strip is disposed in the first flat section, the second lateral strip and the third lateral strip are disposed in the curved region, and the fourth lateral strip is disposed in the second flat section, wherein the carrier extends into the first flat section and into the second flat section 10 mm or less.

11. The curved glass article according to claim 10, wherein the carrier comprises a height extending normal to the glass sheet and wherein the height is 20 mm or less.

12. The curved glass article according to claim 10, wherein the first longitudinal strip and the second longitudinal strip each comprise a chamfered edge and wherein the chamfered edge comprises an angle of from 20° to 60°.

13. The curved glass article according to claim 10, wherein at least two of the first lateral strip, the second lateral strip, the third lateral strip, and the fourth lateral strip are connected to the first longitudinal strip and to the second longitudinal strip to define a closed shape.

14. The curved glass article according to claim 10, wherein none of the first lateral strip, the second lateral strip, the third lateral strip, or the fourth lateral strip extend an entire distance between the first longitudinal strip and the second longitudinal strip to define a substantially closed shape.

15. The curved glass article according to claim 10, wherein the glass sheet comprises a V-shaped or a C-shaped cross-section in the curved configuration.

\* \* \* \* \*